United States Patent [19]

Robinson

[11] 4,031,631

[45] June 28, 1977

[54] APPARATUS FOR REDUCING THE OPACITY OF THE EMISSIONS FROM WOOD DRYERS

[75] Inventor: John W. Robinson, Silsbee, Tex.

[73] Assignee: Kirby Lumber Corporation, Houston, Tex.

[22] Filed: June 20, 1975

[21] Appl. No.: 588,762

[52] U.S. Cl. .................................. 34/235; 34/85; 98/58; 110/184

[51] Int. Cl.² .......................................... F26B 19/00

[58] Field of Search ............ 34/235, DIG. 19, 233, 34/231, 32, 35, 209, 218, 13.4, 13.8, 162, 85; 98/58, 60; 110/184

[56] References Cited

UNITED STATES PATENTS

| | | | |
|---|---|---|---|
| 2,818,660 | 1/1958 | Burkholder | 34/233 |
| 3,160,483 | 12/1964 | Bardet | 34/216 |
| 3,631,655 | 1/1972 | Mullen | 110/184 |
| 3,706,290 | 12/1972 | Holland | 98/58 |
| 3,762,302 | 10/1973 | Piot | 110/184 |

Primary Examiner—Kenneth W. Sprague
Assistant Examiner—James C. Yeung
Attorney, Agent, or Firm—Jennings B. Thompson

[57] ABSTRACT

The apparatus disclosed comprises conduits connecting the outlets of a plurality of heating zones of wood dryers to a common stack through which the emissions from all of the zones are discharged to the atmosphere. The common stack and the conduits between the common stack and the outlets of the heating zones of the dryer or dryers are insulated to maintain the temperature of the gases and vapors coming from each zone reasonably close to the temperature of the heating zone. This result is a reduction in the opacity of the emissions to ten percent or less.

2 Claims, 1 Drawing Figure

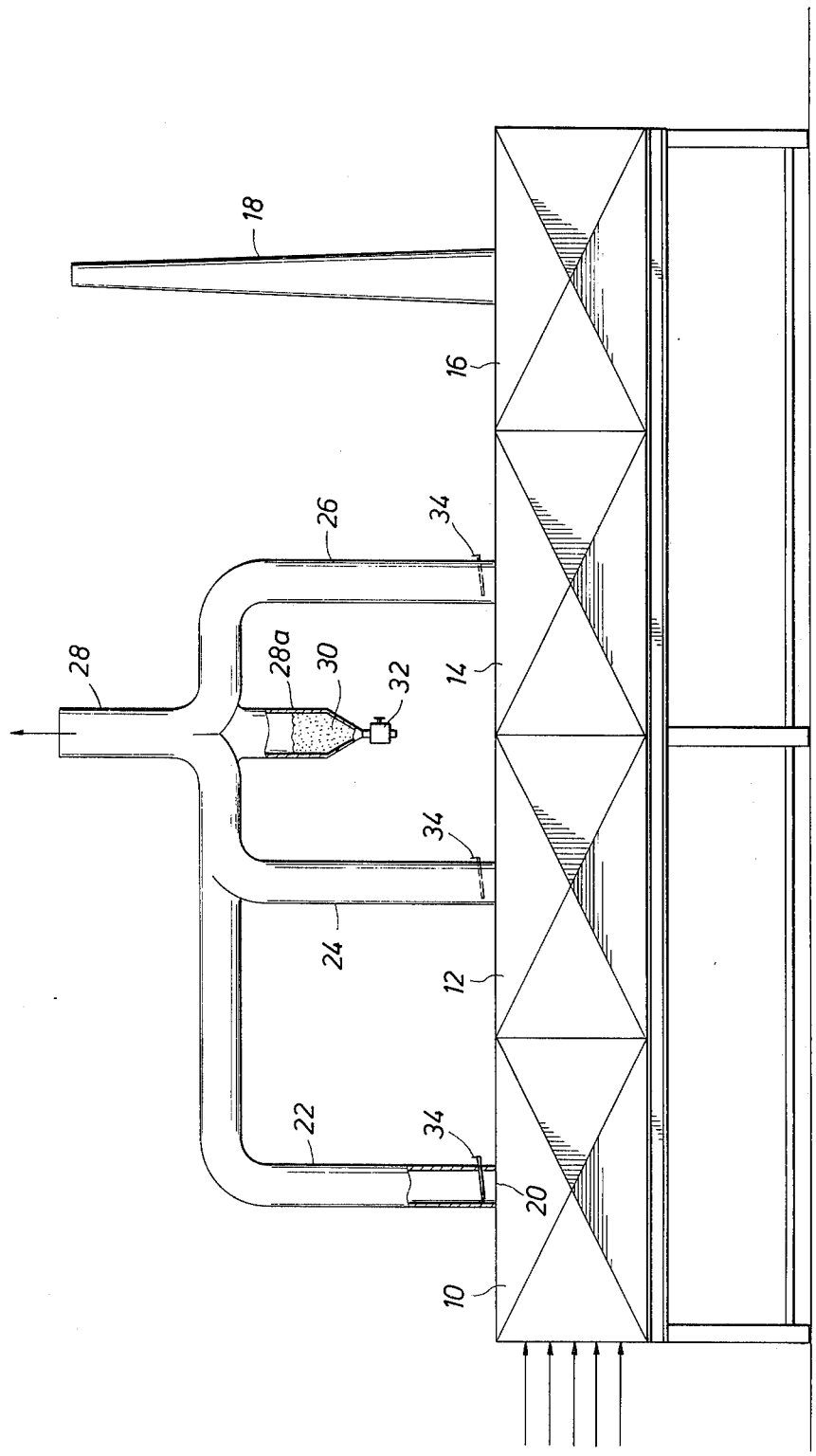

APPARATUS FOR REDUCING THE OPACITY OF THE EMISSIONS FROM WOOD DRYERS

This invention relates to apparatus for reducing the opacity of the emissions from dryers of wood such as veneer, and in particular to the reduction in the visible "blue haze" found in such emissions.

This invention has utility with any wood drying apparatus, but is particularly useful with veneer dryers.

After a layer of veneer has been turned from a log it is passed through a dryer to dry the wood for further processing. The veneer passes through successive heating zones in the dryer and then through a cooling zone as it leaves the dryer. Each heating zone may be maintained at a different temperature and may include several separate heating sections. Natural gas and steam are common sources of heat to maintain the desired temperature in these zones.

As the wood is dried in the heating zones, it produces various gases and vapors that are exhausted from the zones. These include the moisture that is driven off in the drying process, products of combustion, and various natural wood resins, primarily of the turpine class (C-10 and C-20). Also, the exhaust from the heating zones may have entrained in it some fine wood material that is carried out of the zone by the exhaust gases.

The natural wood resins pose the problem with wood dryers. They are emitted from the stacks from each zone of the dryer as a very light blue haze or "smoke". The opacity of the "blue haze" varies somewhat due to climate, wood species, moisture content of the wood, time of year, dryer type and temperature.

This same blue haze is produced in varying amounts by the forests throughout the world. For example, it is the blue haze produced naturally by the forests of the Great Smoky Mountains that give this region of the country its name. Therefore, it is believed that these emissions that are produced by nature, as well as by industry, are not harmful to health. The environment protection agencies throughout the country, however, would like to reduce substantially the visible portion of the emissions from wood dryers to the extent that the public observing the operation of these dryers will not think that the wood dryers are polluting the air. To accomplish this, some state air quality boards are asking that the visible emissions be reduced to where the opacity of the emissions at the stacks be ten percent or less.

It is believed that blue haze is produced by particles which are of such a size as to reflect the blue portion of the light spectrum. These particles apparently are very small. It has been found that blue haze will pass through a 20 oz. Dacron felt dust collector bag which has an efficiency rating of 99.999% at 4 microns. Capturing such minute particles has proven to be very difficult and expensive and has been done with only moderate success, although the plywood industry has been seeking a feasible, economically justifiable solution to the problem. There have been studies by Universities, by companies in the industry, and by the government, including pilot and full scale tests. The following systems have been evaluated at a cost to the industry estimated to be between 4 to 5 million dollars.

1. Fabric Collectors
2. After Burning
3. Electrostatic Precipitators
4. Combination Scrubber-Electrostatis Precipitators
5. Moving Fiberglass Filters
6. Scrubbers of many types
7. Foam System
8. Condensers
9. Hog Fuel Boiler Incineration
10. Temperature Reduction None of the above have proven to be satisfactory. Therefore, it is an object of this invention to provide apparatus for reducing substantially the visible emissions from wood dryers. It is a further object of this invention to provide such apparatus that is economically feasible to construct, install, and operate. It is an additional object and an important feature of this invention to provide such apparatus that will maintain the opacity of the emissions from wood dryers at no more than ten percent and do so without employing expensive equipment such as scrubbers, condensers, and the like.

These and other objects and advantages of this invention will be apparent to those skilled in the art from a consideration of this specification including the attached drawing and appended claims.

In the drawing, a typical veneer dryer is shown equipped with an exhaust system constructed in accordance with this invention.

In attempting to solve the "blue haze" problem, it has been discovered that conducting the exhaust from the several heating zones of the dryer to a common stack virtually eliminated the blue haze and consistently maintained the opacity of the exhaust from the stack at below ten percent. The 10 percent opacity figure is important because as stated above, this is the proposed requirement of certain state air quality control boards. The Texas Air Control Board, for example, has recently decided that the opacity due to blue haze from newly constructed veneer dryers must be reduced to 20 percent or below. Old dryers are allowed 30 percent or below.

According to this invention, this requirement is met in a simple and inexpensive manner. It requires no moving parts and once installed, will operate as maintenance free as any exhaust system can so operate.

In the drawings, a veneer dryer having four zones — 10, 12, 14, and 16 is shown. Zones 10, 12, and 14 are heating zones. Zone 16 is a cooling zone through which the veneer travels before it exits the dryer. Cooling zone 16 has exhaust stack 18 through which the emissions from this zone pass to the atmosphere. Blue haze may be produced from this stack under certain conditions, but generally, this zone is not a problem in this regard.

Each of zones 10, 12, and 14 are usually maintained at different temperatures; the heat can be supplied by natural gas, steam, or whatever is convenient, but steam and natural gas are the most common sources of heat for veneer dryers. Each zone may have a plurality of sections and usually does. The emissions from all of the sections in each zone are exhausted through one or more stacks connected to the zone. Thus, in operation, the veneer enters from the left as viewed in the drawing, and exits from cooling section 16 to the right. The temperature of the heating zones will range between 250° to 400° F. in most operations.

As stated above, conventional dryers have one or more outlets for each zone through which the emissions travel from the zone and into a stack connected to the outlet or outlets as the case may be. According to this invention, conduit means are provided to connect the outlets of the heating zones to a common stack. As shown in the drawing, outlet 20 of zone 10 is connected to conduit 22; the outlet of zone 12 is connected to conduit 24, and the outlet of zone 14 is connected to conduit 26. All the conduits are connected to common stack 28, as shown. A portion of stack 28, portion 28a, extends below the connection of the conduits to the stack to provide sump 30, in which any solid material carried into the stack may fall by gravity. This would include anything that may condense on the way to the stack, of course, or that may condense while in the stack. Valve 32 is provided for cleaning out sump 30.

Preferably the conduits and the stack are well insulated so that the temperature drop of the emissions from the heating zones is kept to a minimum as the gases and vapors travel from the heating zones through the conduits and out stack 28 into the ambient atmosphere. Each conduit is provided with damper 34 which normally closes off up to 90 percent of the outlet from the zone to help hold the heat in the heating zone to make the most efficient use of the fuel used.

As an example of the operation of this invention, a veneer dryer having three zones for heating and a cooling zone, such as shown in the drawing, had a separate exhaust stack for each zone. The first zone was heated by natural gas and the temperature was approximately 425° F. The opacity of the emissions from the first zone averaged from zero to ten percent opacity. The other two zones were heated by steam and maintained at approximately 360° F. The emissions from the second zone had an opacity that averaged between twenty and thirty percent due to the highly visible blue haze. The third zone emissions varied between thirty and forty percent opacity also due to blue haze. After installing the conduit means and common stack of this invention, the opacity of the emissions due to blue haze from common stack 28, operating under substantially the same conditions as before, dropped below 10 percent and remained below 10 percent thereafter on the average. The wood being dried under both conditions was southern pine.

Set out below is the opacity data taken by a trained observer during the months of November, December and January of 1974 and 1975, respectively, for the dryer described above and equipped with the apparatus of this invention.

| Date | *Opacity, % Sky Background | | Green Tree Background | |
|---|---|---|---|---|
| | Avg. | Range | Avg. | Range |
| 11/4/74 | 0 | 0 | | |
| 11/5/74 | 0 | 0 | | |
| 11/11/74 | | | 2.5 | 2-5 |
| 11/12/74 | 3 | 3 | | |
| 12/3/74 | | | 4.0 | 3-5 |
| 1/14/75 | | | 5.0 | 0 |
| 1/27/75 | | | 7.6 | 5-10 |
| 1/29/75 A.M. | | | 7.9 | 5-10 |
| 1/29/75 P.M. | | | 7.4 | 5-10 |
| 1/31/75 | | | 5.0 | 0 |

The apparatus described above has been very successful in reducing opacity. One theory on why such a reduction occurs is that the small particles agglomerate for some reason as they travel through the conduits and that the larger particles so formed do not reflect a visible wave length of light.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the apparatus of this invention without departing from the scope thereof, it is to be understood that all matter herein set forth or shown in the accompanying drawings is to be interpreted as illustrative and not in a limiting sense.

The invention having been described, what is claimed is:

1. In a dryer for veneer having a plurality of heated zones through which the veneer moves as it is being dried and an exhaust outlet associated with each zone for venting gases and vapors from the zone, the improvement for reducing the opacity of the vented gases and vapors comprising a common stack, conduit means connecting each stack to the common stack, and means for insulating the conduit means to reduce the heat loss of the vented gases and vapors as they travel to the common stack.

2. Apparatus for reducing the opacity due to "blue haze" of the emissions from wood dryers having a plurality of heating zones and at least one exhaust port for each zone through which the gases and vapors from the zone are exhausted, said apparatus comprising a common exhaust stack and conduit means connecting each exhaust port to the common stack, and means insulating the conduit means to reduce the temperature drop through the conduit means.

* * * * *